US007173790B2

(12) United States Patent
Kobayashi et al.

(10) Patent No.: US 7,173,790 B2
(45) Date of Patent: Feb. 6, 2007

(54) MAGNETIC DISK APPARATUS WITH DUAL STAGE ACTUATOR

(75) Inventors: Masahito Kobayashi, Ibaraki (JP); Shinsuke Nakagawa, Ibaraki (JP); Hidehiko Numasato, Kanagawa (JP); Yoshio Soyama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/200,999

(22) Filed: Aug. 9, 2005

(65) Prior Publication Data

US 2006/0039079 A1 Feb. 23, 2006

(30) Foreign Application Priority Data

Aug. 19, 2004 (JP) ............................. 2004-239096

(51) Int. Cl.
*G11B 5/596* (2006.01)
(52) U.S. Cl. .................................. 360/78.05
(58) Field of Classification Search ...................... None
See application file for complete search history.

(56) References Cited

FOREIGN PATENT DOCUMENTS

JP 2001-006305 1/2001

*Primary Examiner*—Hoa Thi Nguyen
*Assistant Examiner*—Mitchell Slavitt
(74) *Attorney, Agent, or Firm*—Townsend and Townsend and Crew LLP; Duke Amaniampong

(57) ABSTRACT

In one embodiment, a magnetic disk apparatus comprises a magnetic disk for recording information; a magnetic head that reads information from, or writes information to, the magnetic disk; an actuator device that drives the magnetic head; and a control system that controls the driving of the actuator device. The actuator device is configured by a dual stage actuator comprising a fine actuator that drives the head and a coarse actuator that drives the magnetic head together with the fine actuator. The control system includes a fine controller that generates an operational value for driving the fine actuator and a coarse controller that generates an operational amount for driving the coarse actuator. The control system includes a mechanism for smoothly changing the operational amount generated by the fine controller immediately before saturation resulting from an applied voltage limit of the fine actuator or at the time the fine actuator returns to a control range from the saturation.

18 Claims, 7 Drawing Sheets

MAGNETIC DISK APPARATUS WITH DUAL STAGE ACTUATOR

CROSS-REFERENCES TO RELATED APPLICATIONS

This application claims priority from Japanese Patent Application No. JP2004-239096, filed Aug. 19, 2004, the entire disclosure of which is incorporated herein by reference.

BACKGROUND OF THE INVENTION

The present invention relates to a magnetic disk apparatus, and in particular to a magnetic disk apparatus disposed with a dual stage actuator.

In order to accommodate the increase in recording density accompanying the increase in the recording capacity of magnetic disk apparatus of recent years, there are magnetic disk apparatus configured to position the magnetic head at a predetermined position using a head positioning mechanism called a dual stage actuator. This type of head moving mechanism comprises a coarse actuator, whose movable range is large but whose positioning precision is low, and a fine actuator, whose movable range is small but whose positioning precision is high, and attempts to realize high positioning precision in a wide movable range by controlling these.

As this type of conventional magnetic disk apparatus, there is the magnetic disk apparatus described in JP-A-2001-6305 (Patent Document 1).

As shown in FIG. 7, this magnetic disk apparatus is schematically configured by a sampler 21, an A/D converter 22, a code inverter 23, a fine controller 24, a coarse controller 25, a limiter 26, a subtracter 27, a multiplier 28, D/A converters 29 and 30, and filters 31 and 32. The sampler 21 samples, at predetermined periods, a position error signal SE supplied from a microunit of a head moving mechanism 1, and supplies this to the A/D converter 22. The A/D converter 22 digitally converts the output signal of the sampler 21 into discrete position error data DE and supplies this to the coder inverter 23. The code inverter 23 inverts the code of the position error data DE and supplies this to the fine controller 24.

In this magnetic disk apparatus, a positioning controller is disclosed with correcting means having saturating means 26 that saturates a fine control signal DC1 to within a limit corresponding to the operating range of the fine actuator and supplies this to the fine actuator and which uses a multiplier 28 to multiply an appropriate gain with a difference signal between an output signal DL of the saturating means 26 and the fine control signal DC1 to generate a correction signal DA for correcting the fine control signal DC1.

BRIEF SUMMARY OF THE INVENTION

However, in the magnetic disk apparatus of Patent Document 1, when the fine actuator is returned to the control range from the state where it is saturated, when the control input thereof suddenly changes, this excites an oscillation of a high frequency. Thus, an excessive value of time has been needed until the oscillation is stabilized and data can be read and written.

It is a feature of the present invention to realize a magnetic disk apparatus that can reduce the residual vibration of the response when the head returns to the track center at the time of the application of a shock and the settling response to the target track.

In accordance with an aspect of the present invention, a magnetic disk apparatus comprises a magnetic disk for recording information; a magnetic head that reads information from, or writes information to, the magnetic disk; an actuator device that drives the magnetic head; and a control system that controls the driving of the actuator device, with the actuator device being configured by a dual stage actuator comprising a fine actuator that drives the head and a coarse actuator that drives the magnetic head together with the fine actuator, and the control system including a fine controller that generates an operational value for driving the fine actuator and a coarse controller that generates an operational value for driving the coarse actuator, wherein the control system is disposed with a mechanism for smoothly changing the operational value generated by the fine controller immediately before saturation resulting from an applied voltage limit of the fine actuator or at the time the fine actuator returns to a control range from the saturation.

In specific embodiments, the fine controller is disposed with an integrator including a mechanism which limits an internal state variable to a value corresponding to the applied voltage maximum of the fine actuator.

In accordance with another aspect of the present invention, a magnetic disk apparatus comprises a magnetic disk for recording information; a magnetic head that reads information from, or writes information to, the magnetic disk; an actuator device that drives the magnetic head; and a control system that controls the driving of the actuator device, with the actuator device being configured by a dual stage actuator comprising a fine actuator that drives the head and a coarse actuator that drives the magnetic head together with the fine actuator, and the control system including a fine controller that generates an operational value for driving the fine actuator and a coarse controller that generates an operational variable for driving the coarse actuator, wherein the fine controller is disposed with an integrator including a mechanism which limits an internal state variable to a value corresponding to the applied voltage maximum of the fine actuator, and a filter that is disposed at a rear stage of the integrator and smoothes variations in the generated operational value.

In specific embodiments, the mechanism limiting the internal state variable of the integrator has the characteristic of gradually increasing the limit from the state when fine actuator control is switched ON. The control system independently adds position error, which is the difference between a target value and a head movement value, to the fine controller and the coarse controller. In the control system, an output saturating unit that specifies the applied voltage maximum of the fine actuator is disposed between the fine controller and the coarse controller. The control system adds the output from the output saturating unit of the fine actuator to the input side of the coarse controller via a fine actuator model.

According to the present invention, a magnetic disk apparatus can be provided which can reduce the residual vibration of the response when the head returns to the track center at the time of the application of a shock and the settling response to the target track.

DETAILED DESCRIPTION OF THE INVENTION

Figure 1:
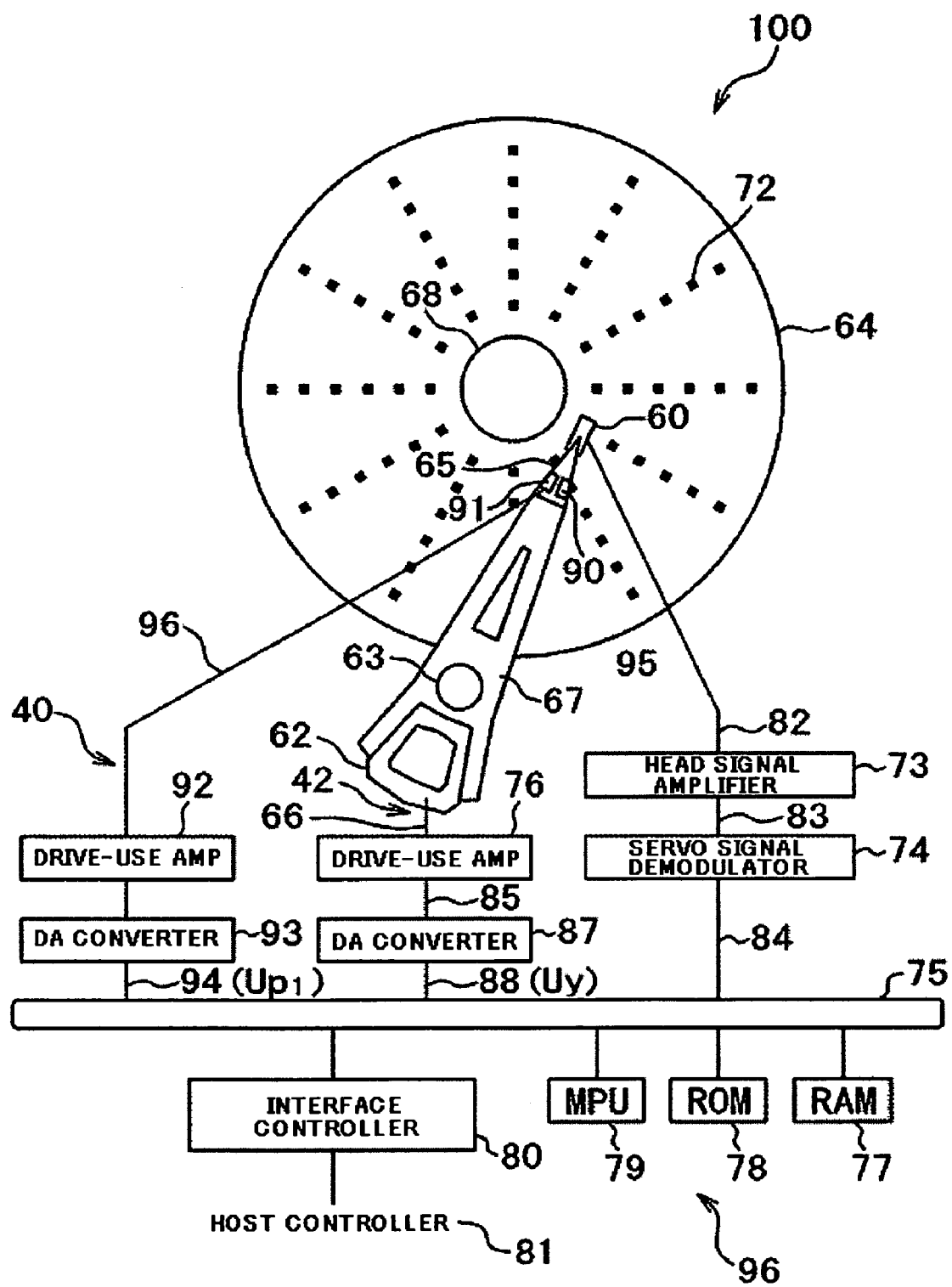
FIG. 1 is a configural diagram of a disk apparatus pertaining to an embodiment of the invention.

A magnetic disk apparatus of an embodiment of the invention will be described below using FIGS. 1 to 6.

The overall configuration of a magnetic disk apparatus 100 of the present embodiment will be described with reference to FIG. 1. The magnetic disk apparatus includes, as main constituent elements, a magnetic disk 64, a magnetic head 60, an actuator device 95, and a microprocessor system 96.

The magnetic disk 64 is rotated at a constant speed at a high speed by a spindle motor 68, and includes tracks for recording information. Position information 72 is prerecorded in the heads of the sectors of each track. The magnetic head 60 reads data recorded in the tracks of the corresponding magnetic disk 64 and writes data to the tracks.

The actuator device 95 is configured by a dual stage actuator comprising a fine actuator 40 and a coarse actuator 42.

The fine actuator 40 includes, as main constituent elements, a suspension 65, piezo elements 90 and 91, a fine actuator drive-use amp 92, and a D/A conversion circuit 93.

The magnetic head 60 is supported by the suspension 65, and the suspension 65 is driven by the two piezo elements 90 and 91. Thus, the magnetic head 60 is driven by the piezo elements 90 and 91. The piezo elements 90 and 91 are supported by a carriage 67 and function as a driving portion of the fine actuator 40. Namely, when the one piezo element 90 expands and the other piezo element 91 contracts, the magnetic head 60 moves minutely. Conversely, when the piezo element 91 expands and the piezo element 90 contracts, the magnetic head 60 moves minutely in the opposite direction.

The coarse actuator 42 includes, as main constituent elements, the carriage 67, a voice coil motor 62, a coarse actuator drive-use amp 76, and a D/A conversion circuit 87. The carriage 67 is integrally driven with the magnetic head 60 by the voice coil motor 62. In accompaniment with the movement of the voice coil motor 62, the carriage 67 is moved around a pivot shaft 63 from the outer periphery of the magnetic disk 64 in the inner peripheral direction or in the opposite direction. In accompaniment therewith, the magnetic head 60 is similarly moved. The voice coil motor 62 configures the drive unit of the coarse actuator 42.

The position information 72 is prerecorded in the magnetic disk 64 every sampling time Ts. Recorded in the position information 72 are a mark portion representing the head of the sector, an AGC (automatic gain control) pull-in portion, a track number, and a burst signal for detecting the relative position. The magnetic head 60 detects the deviation between the magnetic head 60 and the position information recorded in the disk surface even sampling time Ts, and supplies a deviation signal 82 to a head signal amplifier 73. The head signal amplifier 73 amplifies the deviation signal 72 and supplies an amplified deviation signal 83 to a servo signal demodulator 74. The servo signal demodulator 74 is disposed with an AD converter and generates a head position signal 84 on the basis of the amplified deviation signal 83.

In FIG. 1, the calculation of a coarse actuator-use operational value 88 ($u_{p1}$ in FIG. 2), the calculation of a fine actuator-use operational value 94 ($u_v$ in FIG. 2) and the generation of a target value (46 in FIG. 2) for movement are executed by the microprocessor system 96. The microprocessor system 96 is configured by a microprocessor 79 being connected to a RAM (Random Access Memory) 77 and a ROM (Read-Only Memory) 78 via a bus line 75. Various programs such as control systems are stored in the ROM 78. Control system state variables are temporarily stored in the RAM 77. The microprocessor 79 executes calculation of various control systems and outputs the operational value 88 that drives the coarse actuator 42 and the operational value 94 that drives the fine actuator 40. The coarse actuator operational value 88 and the fine actuator operational value 94 are respectively converted from digital value to analog value by the D/A conversion circuits 87 and 93 and sent to the drive-use amps 76 and 92, and the voice coil motor 62 and the piezo elements 90 and 91 are driven. An interface controller 80 transmits various commands from a host controller 81 to the microprocessor 79.

Figure 2:
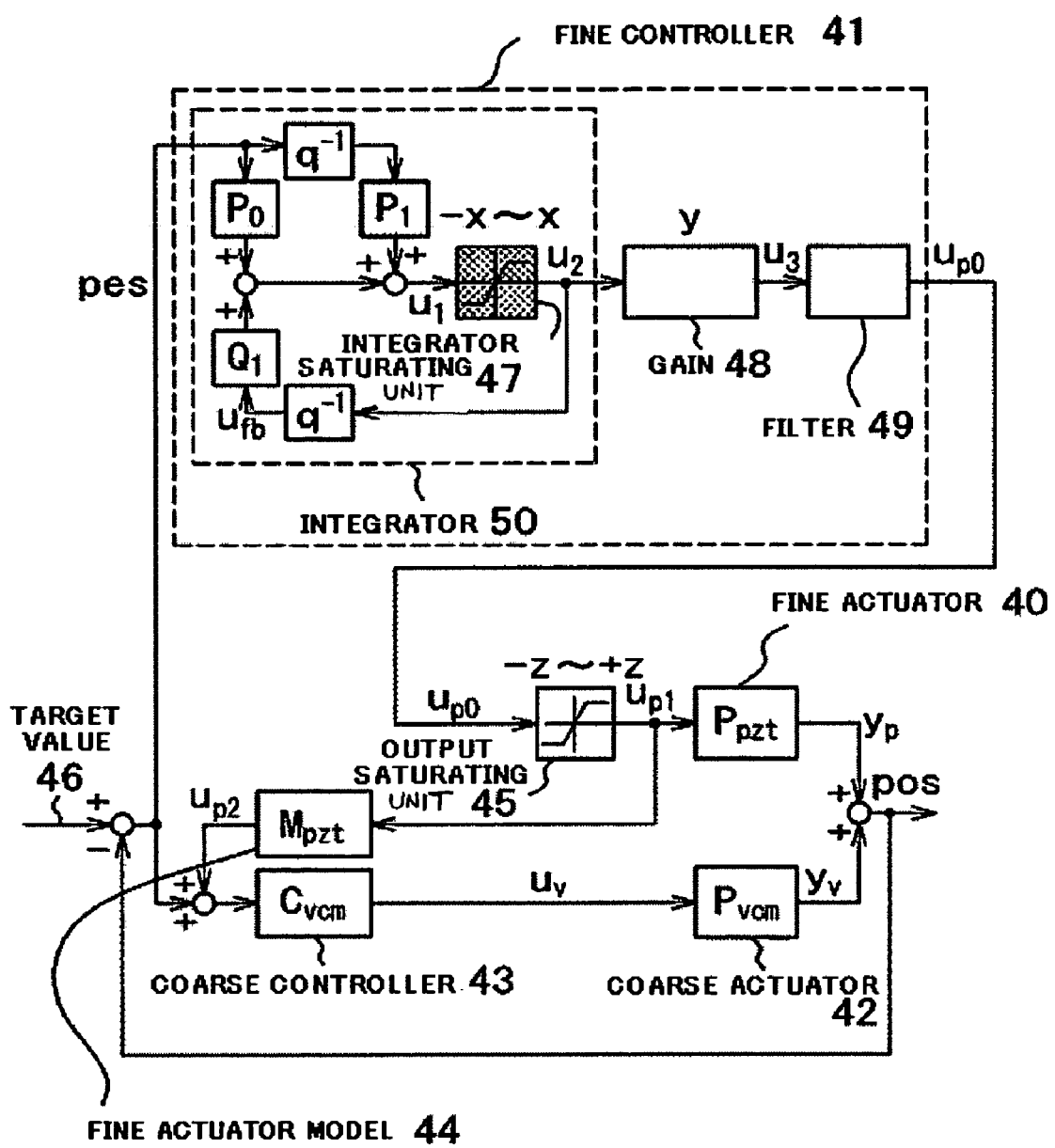
FIG. 2 is a block line diagram of a track-following control system in the embodiment.

Next, the control system of the magnetic disk apparatus 100 will be described with reference to FIG. 2. FIG. 2 is a block diagram of a track-following control system of the magnetic disk apparatus 100 of the present embodiment.

The control target dual stage actuator includes two actuators: the fine actuator 40 and the coarse actuator 42. The operational value to the coarse actuator 42 will be represented by $u_v$, and the operational value to the fine actuator 40 will be represented by $u_{p1}$. Although they cannot be observed, the movement value of the coarse actuator 42 will be represented by $y_v$, and the movement value of the fine actuator 40 will be represented by $y_p$. What can be observed is a head movement value pos in which the coarse actuator movement value $y_v$ and the fine actuator movement value $y_p$ are added together. In this manner, the control target dual stage actuator system comprises the two input systems of the coarse actuator-use operational value $u_v$ and the fine actuator-use operational value up1 and the one output system of the head movement value pos. It will be noted that the fine actuator 40 ordinarily includes mechanical resonance in about 10 kHz of a high region.

In the present embodiment, a fine controller 41 and a coarse controller 43 are independently designable to configure a dual stage actuator control system with a decoupled structure. Namely, as shown in FIG. 2, the fine controller 41 is configured independently from the coarse controller 43, and configured so as not to directly use the coarse actuator-use operational value $u_v$ of the coarse actuator 43 in the control of the fine controller 41.

The fine controller 41 includes an integrator 50, a gain 48, and a filter 49. The integrator 50 includes gains $P_0$, $P_1$ and $Q_1$, an operator $q^{-1}$ and an integrator saturating unit 47. Position error pes is inputted to the fine controller 41, and the fine controller 41 conducts a predetermined calculation on the basis of this, generates an integrator output $u_2$ and supplies this to the gain 48. The operator $q^{-1}$ is an operator that represents a one sample delay.

The gain 48 generates a gain output $u_3$ by multiplying the gain with the integrator output $u_2$ so that it becomes an appropriate control band, and supplies the gain output $u_3$ to the filter 49. The filter 49 generates a fine controller output $u_{po}$ by filtering the gain output $u_3$, and supplies the fine controller output $u_{po}$ to output saturating unit 45. The filter 49 includes the function of stabilizing the mechanical resonance of the high region of the fine actuator 40.

The output saturating unit 45 sets a maximum z in consideration of a later-described maximum control input $V_{pz}$ of the fine actuator 40. When the fine controller output $u_{po}$ exceeds the maximum z, the output saturating unit 45 generates the fine actuator-use operational value $u_{p1}$ (the fine actuator operational value 94 of FIG. 1) that is a saturated output and supplies this to the fine actuator 40.

Figure 3:
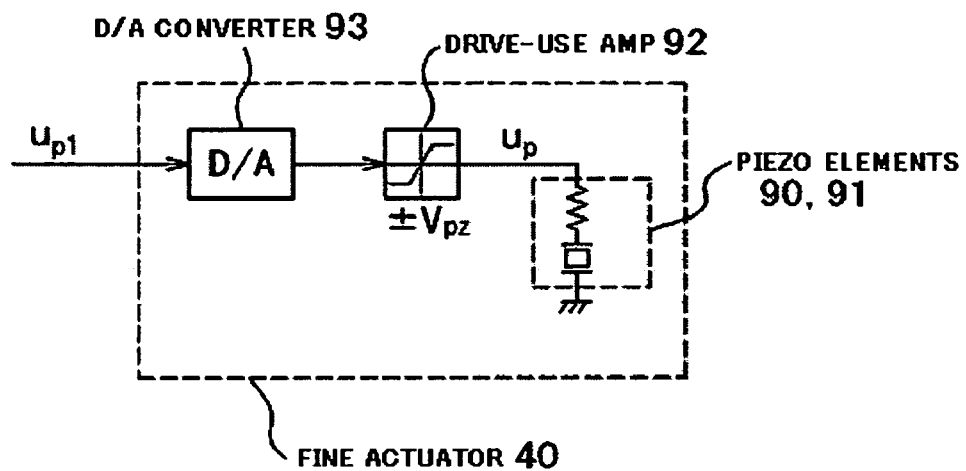
FIG. 3 is a block diagram of a fine actuator in the embodiment.

As shown in FIG. 3, the fine actuator 40 is configured by the D/A conversion circuit 93, the fine actuator drive-use amp 92 and the piezo element 90 or 91 being serially connected. The D/A conversion circuit 93 converts the fine actuator-use operational value $u_{p1}$ inputted to the fine actuator 40 to an analog value and supplies this to the fine actuator drive-use amp 92. The fine actuator drive-use amp 92 amplifies the fine actuator-use operational value $u_{p1}$ converted to the analog value, generates a control input up, and supplies this to the piezo element 90 or 91. The fine actuator drive-use amp 92 is configured so that the maximum output is limited to $V_{pz}$. The control input $u_p$ is inputted to the piezo elements 90 and 91 represented as equivalent circuits in FIG. 3, and the piezo elements 90 and 91 generate the movement value $y_p$ of the fine actuator 40 shown in FIG. 2.

In the configuration of the dual stage actuator control system of the present embodiment, the movement value $y_p$ of the fine actuator 40 cannot be directly observed. Thus, the movement value $y_p$ is estimated using a model 44 of the fine actuator 40. In the fine actuator 40 using the piezo elements 90 and 91, from the input $u_{p1}$ to the movement value $y_p$ can be approximated as a substantial gain, whereby the value obtained by multiplying the gain of the fine actuator 40 with the output $u_{p1}$ of the fine controller 41 can be regarded as the movement value $y_p$ of the fine actuator 40. In the present embodiment, the fine actuator 40 satisfying this condition is connected to the output side of the output saturating unit 45, and the output $u_{p2}$ of the output saturating unit 45 is regarded as the movement value $y_p$ and used for the input to the coarse controller 43.

A deviation signal in which the output $u_{p2}$ of the fine actuator model 44 and the position error pes are added together is inputted to the coarse controller 43. As for the coarse controller 43, even after the position error pes has become zero due to the fine actuator 40, feedback control is next conducted to reduce the movement value $y_p$ of the fine actuator 40. In accompaniment therewith, the fine controller 41 also operates, whereby the head position error signal is retained at the target position, the output of the fine actuator 40 is reduced, and the fine actuator 40 can be retained at zero, i.e., the center position of the movable range. Thus, the capability of the fine actuator 40, whose stroke is narrowly limited, can be utilized to a maximum.

Next, a control operation will be described which prevents a sudden change in the control input to prevent oscillation excitation when a shock is applied from the outside of the magnetic disk apparatus 100 and the fine actuator 40 returns to the control range from the saturated state.

A limit±x of the integrator saturating unit 47 is set to become x=z/y determined from a limit±z of the output saturating unit 45 and a value y of a loop gain. Thus, the state variable $u_{fb}$ of the integrator 50 of the fine controller 41 is also limited to a value corresponding to the fine maximum control input. Therefore, when the integrator output $u_2$ is saturated, the corresponding fine actuator-use operational value $u_{p1}$ is also saturated, and when the integrator output $u_2$ returns to the control range from saturation, the fine actuator-use operational value $u_{p1}$ also quickly returns to the control range. In this manner, according to the present embodiment, the problem of the delay in the return response from the saturation of the fine actuator-use operational value $u_{p1}$ arising in case of having no integrator saturating unit 47 can be eliminated.

The filter 49 disposed at the rear stage of the gain 48 comprises a notch filter and a low pass filter that removes the high-frequency component. The gain output $u_3$ is set by the integrator saturating unit 47 so as to not exceed the limit range of the fine actuator-use operational value $u_{p1}$. Thus, even when the integrator output $u_2$ is saturated, removal of mechanical resonance and removal of vibrational force of high-order oscillation by the filter 49 are conducted with respect to the fine actuator-use operational value $u_{p1}$, and the fine operational value in the vicinity of the saturation value and at the time of return from saturation is smoothed.

Figure 4:
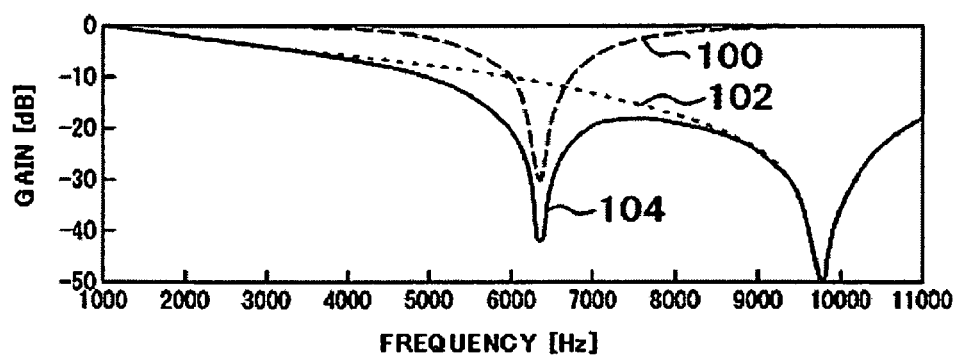
FIG. 4 shows frequency characteristic diagrams of the phase and gain of a filter of the fine actuator in the embodiment.
Figure 4:
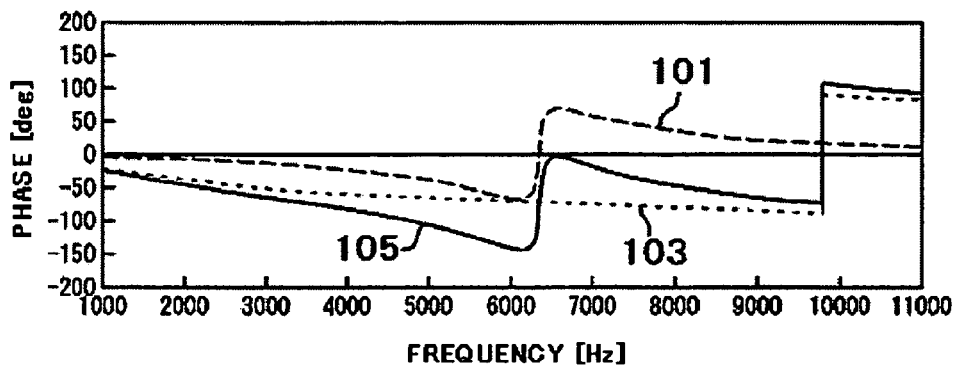

An example of the frequency characteristics of the filter 49 is shown in FIG. 4. The filter 49 in the present embodiment comprises two filters, whose gain characteristics with respect to frequency are respectively represented by 100 and 102 and whose phase characteristics are respectively represented by 101 and 103. The gain characteristic of the filter 49 in which these filters are serially connected is represented by 104, and the phase is represented by 105. In this manner, the filter 49 has the role of lowering the gain of the major mechanical resonance hindering the stabilization of the control system, decreasing the gain of the high frequency, and making smooth the fine operational value in the vicinity of the saturation value and at the time of return from saturation.

Figure 5A:
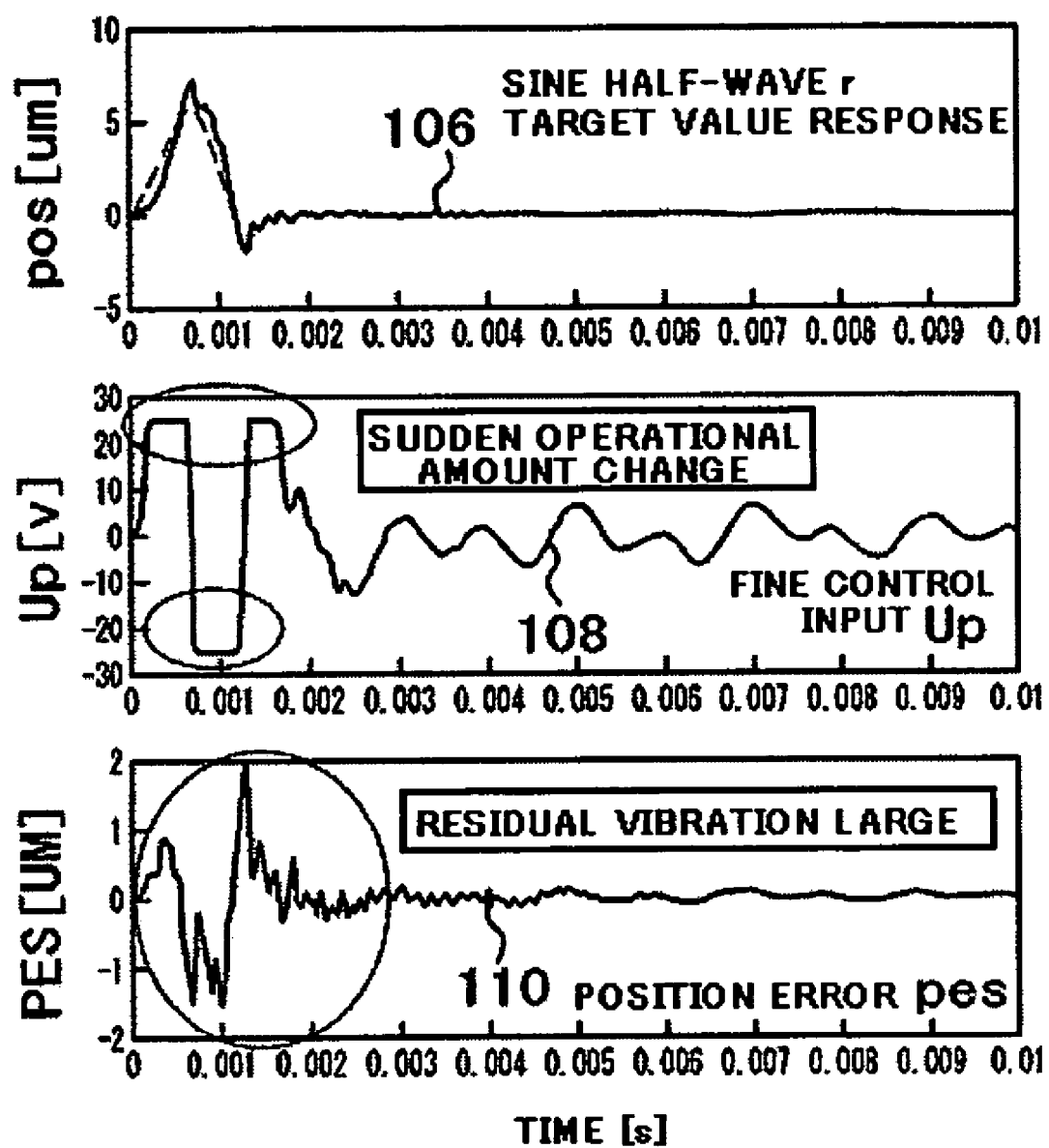
FIG. 5A shows time response waveform diagrams of vibration input, a fine actuator-use operational value and position error of a dual stage actuator not having integrating and saturating unit.

FIG. 5A shows time responses of a time waveform 106 of the head movement value pos, a time waveform 108 of the fine actuator control input up and a time waveform 110 of the position error pes in a case where a sine half-wave simulating a shock is inputted as the target value 46 when the fine controller 41 does not have the integrator saturating unit 47. The time waveform 108 of the fine actuator control input up suddenly changes at the time of saturation and when it returns to the control range from saturation, this excites high-order mechanical resonance, residual vibration of the time waveform 110 of the position error pes is generated, and stabilization to the target position is slow.

Figure 5B:
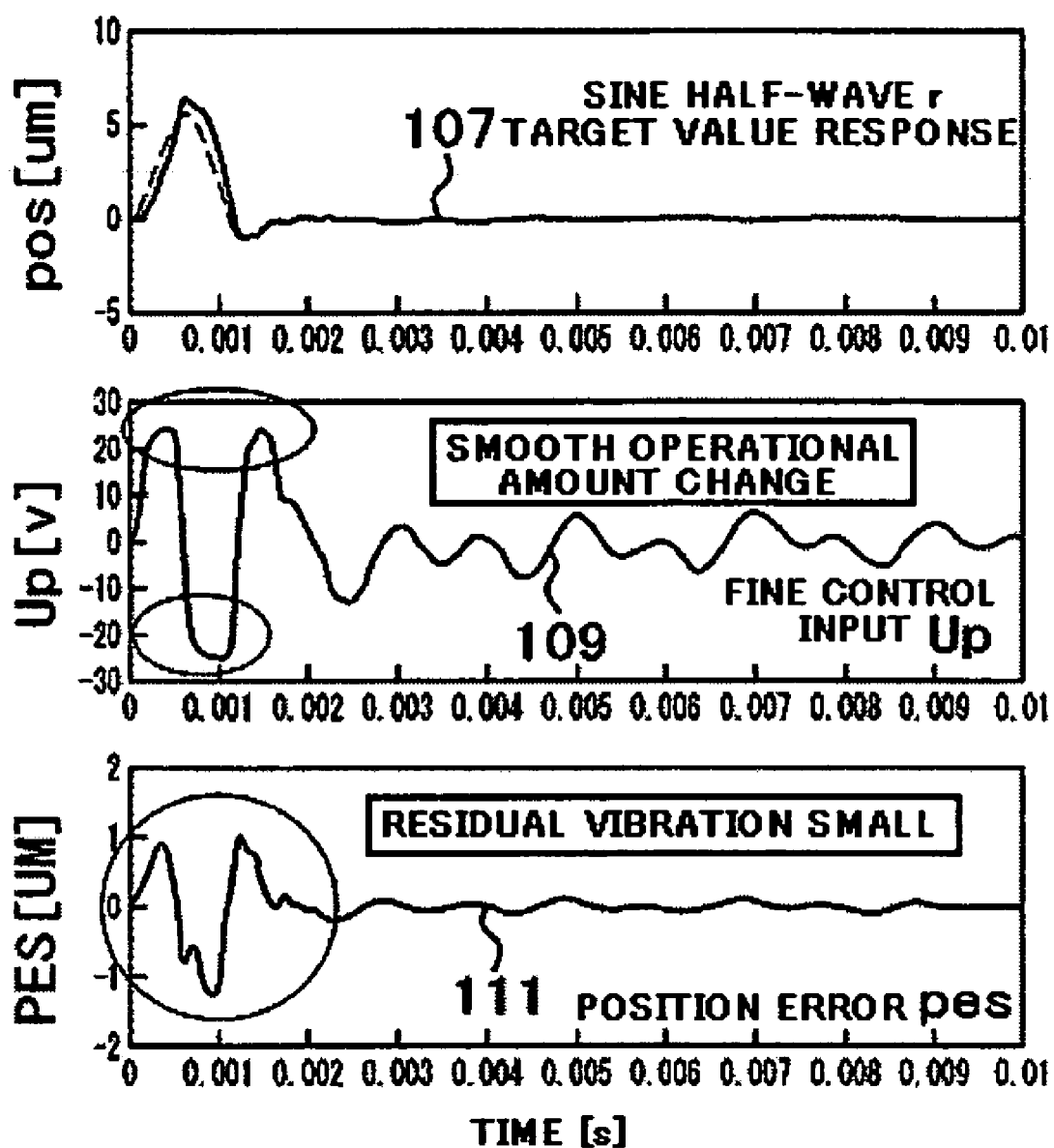
FIG. 5B shows time response waveform diagrams of vibration input, a fine actuator-use operational value and position error of a dual stage actuator having integrating and saturating unit in the embodiment.

FIG. 5B shows time responses of a time waveform 107 of the head movement value pos, a time waveform 109 of the fine actuator control input up and a time waveform 111 of the position error pes in a case where a sine half-wave simulating a shock is inputted as the target value 46 when the integrator saturating unit 47 of the present embodiment is present. The time waveform 109 of the fine actuator control input $u_p$ smoothly changes in the vicinity of the saturation value (±25 V) and the effect of reducing high-frequency residual vibration could be observed in the time waveform 111 of the position error.

Figure 6A:
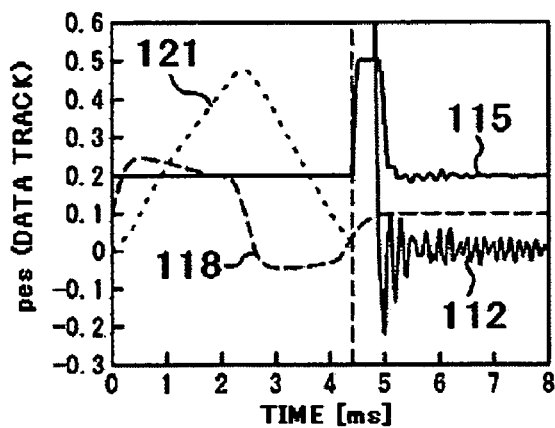
FIG. 6A is a time response waveform diagram at a seek time of an actuator device not having integrating and saturating unit.
Figure 6B:
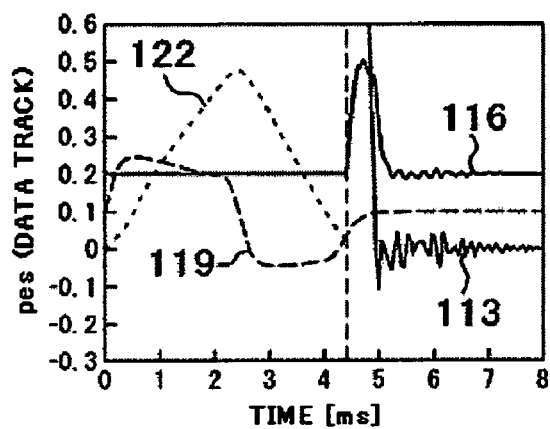
FIG. 6B is a time response waveform diagram at a seek time of a dual stage actuator device having integrating and saturating unit.
Figure 6C:
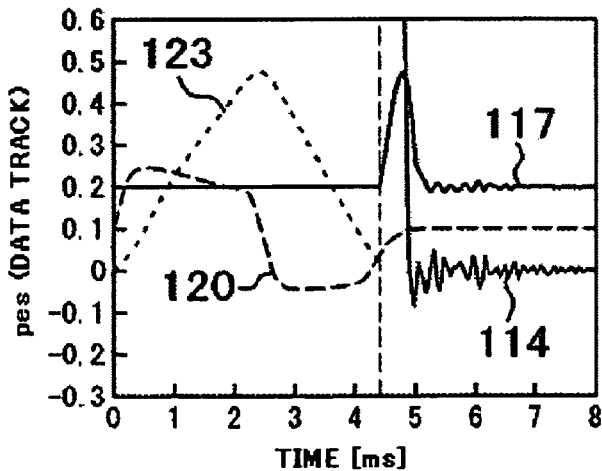
FIG. 6C is a time response waveform diagram at a seek time of a dual stage actuator device having integrating and saturating unit of the embodiment.
Figure 7:
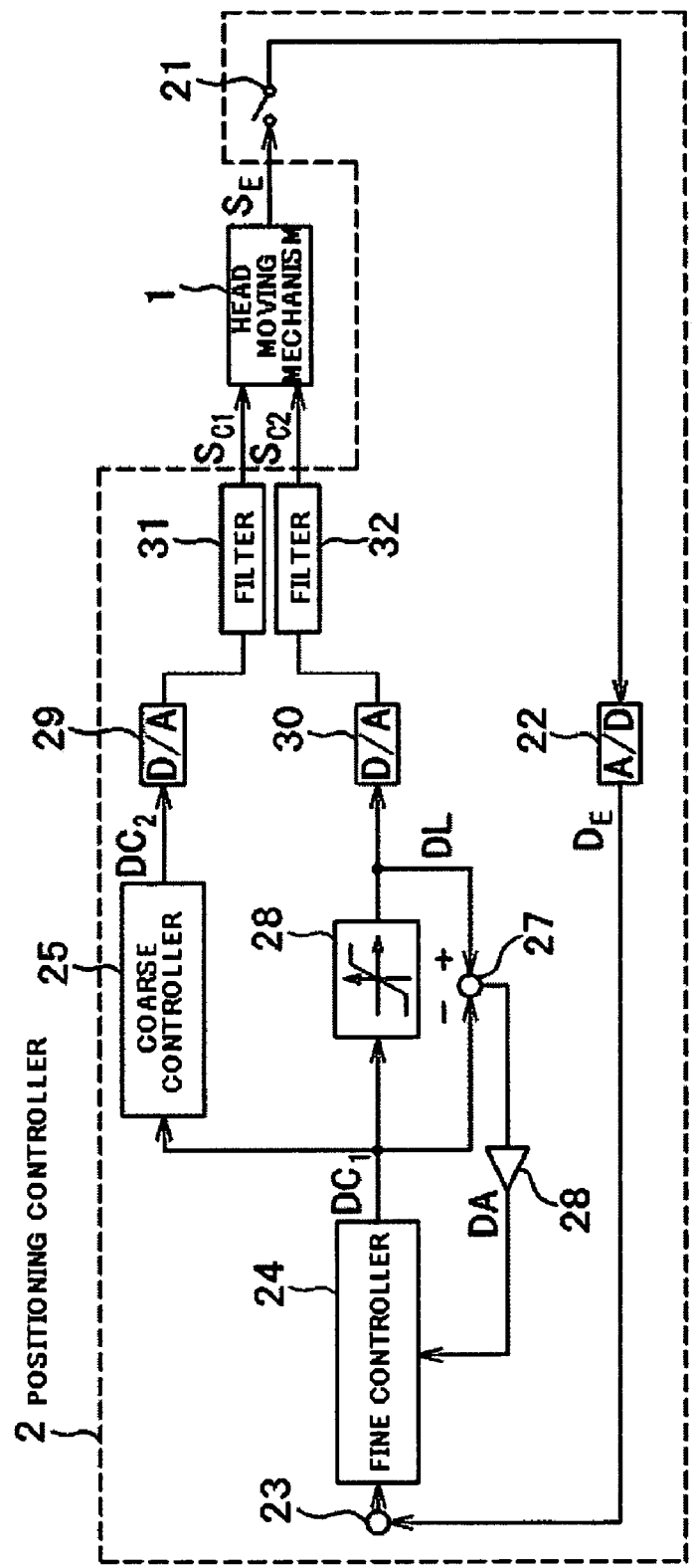
FIG. 7 is a block diagram showing the electrical configuration of a positioning controller of a head moving mechanism of a conventional magnetic disk apparatus disposed with a dual stage actuator.

Next, seek response will be described with reference to FIGS. 6A to 6C. FIGS. 6A to 6C show a comparison of seek responses.

First, the seek control system will be described. When the remaining distance to the target track is large, a velocity target value corresponding to the remaining distance is given, and the magnetic head is moved so that the acceleration capability of the coarse actuator 42 is exhibited to a maximum. In the vicinity of the target track, the mode is switched to control called a settling mode. In the settling mode, the fine actuator 40 is operated and the magnetic head is positioned by the configuration of the control system of FIG. 2. At the time of this switching, the target value 46 is given as a time trajectory reaching the target track (final target value) after a constant time and the magnetic head is controlled following this so as to be smoothly stabilized to the target track (final target value). In the present embodiment, the control of the dual stage actuator is conducted from the time the settling mode starts.

FIG. 6A shows, in the fine controller 41, the seek response of the magnetic head to the target track in a case where the integrator saturating unit 47 is not present. Here, a time waveform 112 of the head movement value pos, a time waveform 118 of a coarse control current and a time waveform 115 of the fine actuator control input up are shown using the target track as a zero track. The time waveform 115 of the fine control input suddenly changes at the time of saturation and when returning to the control range from saturation, and excites a high-order mechanical resonance in the settling response of the head position.

FIG. 6B shows, in the fine controller 41, the seek response of the magnetic head to the target track in a case where the integrator saturating unit 47 is present. The time waveform 116 of the fine control input up smoothly increases in the vicinity of the saturation value, and smoothly changes also when returning to the control range. It will be understood that, as a result, the high-frequency component in the residual vibration of the time waveform 113 of the head movement value pos is reduced, and the settling response of the position becomes smooth. The above is the operation of anti-windup control.

Moreover, FIG. 6C shows slew-rate control where the limit ±x of the integrator saturating unit 47 is incrementally increased so that it finally becomes x=z/y in order to make smooth the operational value change at the initial stage of settling switching. When the limit x is increased at an equal rate to become a maximum at 0.32 ms, the change of the time waveform 117 of the fine actuator operational value $u_{pv}$ becomes smoother in comparison to FIG. 6B, and the residual vibration of the time waveform 114 of the position is reduced.

Due to the drive device of the dual stage actuator disclosed in the preceding embodiment, the response when the head returns to the track center at the time of the application of a shock and the settling response to the target track can be made into good responses with small residual vibration.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk apparatus comprising:
   a magnetic disk for recording information;
   a magnetic head that reads information from, or writes information to, the magnetic disk;
   an actuator device that drives the magnetic head; and
   a control system that controls the driving of the actuator device,
   with the actuator device being configured by a dual stage actuator comprising a fine actuator that drives the head and a coarse actuator that drives the magnetic head together with the fine actuator, and
   the control system including a fine controller that generates an operational value for driving the fine actuator and a coarse controller that generates an operational value for driving the coarse actuator,
   wherein the control system includes means for smoothly changing the operational value generated by the fine controller immediately before saturation resulting from an applied voltage limit of the fine actuator or at the time the fine actuator returns to a control range from the saturation.

2. The magnetic disk apparatus of claim 1, wherein the fine controller is disposed with an integrator including means for limiting an internal state variable to a value corresponding to the applied voltage maximum of the fine actuator.

3. The magnetic disk apparatus of claim 2, wherein the means for limiting the internal state variable of the integrator has the characteristic of gradually increasing the limit from the state when fine actuator control is switched ON.

4. A magnetic disk apparatus comprising:
a magnetic disk for recording information;
a magnetic head that reads information from, or writes information to, the magnetic disk;
an actuator device that drives the magnetic head; and
a control system that controls the driving of the actuator device, with the actuator device being configured by a dual stage actuator comprising a fine actuator that drives the head and a coarse actuator that drives the magnetic head together with the fine actuator, and the control system including a fine controller that generates an operational value for driving the fine actuator and a coarse controller that generates an operational value for driving the coarse actuator,
wherein the fine controller has an integrator including means for limiting an internal state variable to a value corresponding to the applied voltage maximum of the fine actuator, and a filter that is disposed at a rear stage of the integrator and smoothes variations in the generated operational value.

5. The magnetic disk apparatus of claim 4, wherein the means for limiting the internal state variable of the integrator has the characteristic of gradually increasing the limit from the state when fine actuator control is switched ON.

6. The magnetic disk apparatus of claim 5, wherein the control system independently adds position error, which is the difference between a target value and a head movement amount, to the fine controller and the coarse controller.

7. The magnetic disk apparatus of claim 6, wherein in the control system, output saturating means for specifying the applied voltage maximum of the fine actuator is disposed between the fine controller and the coarse controller.

8. The magnetic disk apparatus of claim 7, wherein the control system adds the output from the output saturating means of the fine actuator to the input side of the coarse controller via a fine actuator model.

9. A magnetic disk apparatus comprising:
a magnetic disk for recording information;
a magnetic head that reads information from, or writes information to, the magnetic disk;
an actuator device that drives the magnetic head; and
a control system that controls the driving of the actuator device,
with the actuator device being configured by a dual stage actuator comprising a fine actuator that drives the head and a coarse actuator that drives the magnetic head together with the fine actuator, and
the control system including a fine controller that generates an operational value for driving the fine actuator and a coarse controller that generates an operational value for driving the coarse actuator,
wherein the fine controller includes an integrator, a gain, and a filter disposed at a rear stage of the integrator and configured to smoothly change the operational value generated by the fine controller immediately before saturation resulting from an applied voltage limit of the fine actuator or at the time the fine actuator returns to a control range from the saturation.

10. The magnetic disk apparatus of claim 9, wherein the integrator includes an integrator saturating unit.

11. The magnetic disk apparatus of claim 9, wherein the integrator includes a mechanism which limits an internal state variable to a value corresponding to the applied voltage maximum of the fine actuator.

12. The magnetic disk apparatus of claim 11, wherein the mechanism limiting the internal state variable of the integrator gradually increases the limit from the state when fine actuator control is switched ON.

13. A magnetic disk apparatus comprising:
a magnetic disk for recording information;
a magnetic head that reads information from, or writes information to, the magnetic disk;
an actuator device that drives the magnetic head; and
a control system that controls the driving of the actuator device, with the actuator device being configured by a dual stage actuator comprising a fine actuator that drives the head and a coarse actuator that drives the magnetic head together with the fine actuator, and the control system including a fine controller that generates an operational value for driving the fine actuator and a coarse controller that generates an operational value for driving the coarse actuator,
wherein the fine controller comprises an integrator including a mechanism which limits an internal state variable to a value corresponding to the applied voltage maximum of the fine actuator, and a filter that is disposed at a rear stage of the integrator and smoothes variations in the generated operational value.

14. The magnetic disk apparatus of claim 13, wherein the mechanism limiting the internal state variable of the integrator gradually increases the limit from the state when fine actuator control is switched ON.

15. The magnetic disk apparatus of claim 14, wherein the control system independently adds position error, which is the difference between a target value and a head movement amount, to the fine controller and the coarse controller.

16. The magnetic disk apparatus of claim 15, wherein in the control system, output saturating unit that specifies the applied voltage maximum of the fine actuator is disposed between the fine controller and the coarse controller.

17. The magnetic disk apparatus of claim 16, wherein the control system adds the output from the output saturating unit of the fine actuator to the input side of the coarse controller via a fine actuator model.

18. The magnetic disk apparatus of claim 13, wherein the integrator includes an integrator saturating unit.

* * * * *